United States Patent [19]

Anonuma et al.

[11] Patent Number: 4,511,484

[45] Date of Patent: Apr. 16, 1985

[54] PROCESS FOR PREPARING MAGNETIC COATING COMPOSITION

[75] Inventors: Masashi Anonuma; Yasuo Tamai; Tsunehiko Sato; Shinichi Funabashi; Hiroshi Ogawa, all of Kanagawa, Japan

[73] Assignee: Fuji Photo Film Co., Kanagawa, Japan

[21] Appl. No.: 495,869

[22] Filed: May 18, 1983

[30] Foreign Application Priority Data

May 18, 1982 [JP] Japan .................................. 57-83567

[51] Int. Cl.$^3$ ............................. H01F 1/00; H01F 1/26
[52] U.S. Cl. .................................. 252/62.54; 427/128; 428/900
[58] Field of Search ....................................... 252/62.54

[56] References Cited

U.S. PATENT DOCUMENTS

| | | | |
|---|---|---|---|
| 2,581,414 | 1/1952 | Hochberg | 106/253 |
| 2,855,156 | 10/1958 | Hochberg et al. | 106/253 |
| 4,137,188 | 1/1979 | Uetake et al. | 252/62.54 |
| 4,262,076 | 4/1981 | Hakumoto et al. | 252/62.54 |
| 4,285,825 | 8/1981 | Isobe et al. | 252/62.54 |
| 4,356,232 | 10/1982 | Tadokoro et al. | 252/62.54 |
| 4,420,532 | 12/1983 | Yamaguchi et al. | 252/62.54 |

*Primary Examiner*—Arthur P. Demers
*Attorney, Agent, or Firm*—Sughrue, Mion, Zinn, Macpeak, and Seas

[57] ABSTRACT

A process for preparing a magnetic coating composition using a dried magnetic metal powder, or a magnetic metal powder containing 50% by weight or less of a solvent is described. The process comprises adding from 0.1 to 10 parts by weight of an abrasive, from 5 to 20 parts by weight of a main binder, and from 0 to 60 parts by weight of a solvent to 100 parts by weight (calculated as a dry powder) of the magnetic metal powder and, thereafter, kneading the resulting mixture while applying a shearing stress of from about 20 to about 300 kg/cm$^2$.

13 Claims, No Drawings

PROCESS FOR PREPARING MAGNETIC COATING COMPOSITION

FIELD OF THE INVENTION

The present invention relates to a process for preparing a magnetic coating composition using magnetic metal powder, and more particularly, to a process for preparing a magnetic coating composition which is suitable for use in the production of magnetic recording media for audio and video tape recorders and computers, for example, magnetic tapes, magnetic disks and magnetic drums.

BACKGROUND OF THE INVENTION

In general, acicular metal particles are used in the production of magnetic recording media, and granular or spherical metal particles are also used for specific utilities. These acicular metal particles are very fine particles in which the particle diameter (in the short axis direction) is in the range of from 150 to 500 Å preferably in the range of from 200 to 300 Å, and the axis ratio (short axis:long axis) is generally in the range of from 2 to 15. The specific surface area ($S_{BET}$) of such acicular metal particles is at least 25 m²/g and preferably at least 30 m²/g.

Various methods for the production of such magnetic metal powders are known, and can be exemplified as follows:

(1) A method comprising heat-decomposing an organic acid salt of ferromagnetic metal, followed by reducing with a reducing gas, as disclosed in, for example, Japanese Patent Publication Nos. 11412/61, 22230/61, 14809/63, 3807/64, 8026/65, 8027/65, 15167/65, 16899/65 (corresponding to U.S. Pat. Nos. 3,186,829), 12096/66, 14818/66 (corresponding to U.S. Pat. Nos. 3,190,748), 24052/67, 3221/68, 22394/68, 29268/70, 4471/69, 27944/69, 38755/71, 4286/72, 38417/72, 41158/72, and 29280/73, and Japanese Patent Application (OPI) No. 38523/72 (the term "OPI" as used herein means a "published unexamined Japanese patent application");

(2) A method comprising reducing acicular oxyhydroxide alone or in combination with other metals, or reducing acicular iron oxides obtained from such oxyhydroxide, as disclosed in, for example, Japanese Patent Publication Nos. 3862/60, 11520/62, 20335/64, 20939/64, 24833/71, 29706/72, 30477/72 (corresponding to U.S. Pat. Nos. 3,598,568), 39477/72, 24952/73, and 7313/74, and Japanese Patent Application (OPI) Nos. 5057/71 (corresponding to U.S. Pat. Nos. 3,634,063), 7153/71, 38523/72, 79153/73, 82395/73, and 97738/74, and U.S. Pat. Nos. 3,607,219, 3,607,220, and 3,607,220;

(3) A method comprising vaporizing ferromagnetic metals in a low pressure inert gas, as disclosed in, for example, Japanese Patent Publication Nos. 25620/71, 4131/72, and 27718/72, Japanese Patent Application (OPI) Nos. 25662/73, 25663/72, 25664/72, 25665/72, 31166/73, 55400/73, and 81092/73, and Japanese Patent Publication Nos. 15320/74 and 18160/74;

(4) A method comprising heat-decomposing a metal carbonyl compound, as disclosed in, for example, Japanese Patent Publication Nos. 1004/64, 3415/65, 16968/70 and 26799/74, and U.S. Pat. Nos. 2,983,997, 3,172,776, 3,200,007 and 3,228,882;

(5) A method comprising electrically depositing a ferromagnetic metal powder using a mercury cathode, as disclosed in, for example, Japanese Patent Publication Nos. 12910/60, 3860/61, 5513/61, 787/74, 15525/74, 8123/65, 9605/65 (corresponding to U.S. Pat. No. 3,198,717) and 19661/70 (corresponding to U.S. Pat. No. 3,156,650), and U.S. Pat. No. 3,262,812; and (6) A method comprising adding a reducing agent to a solution of ferromagnetic metal salt to reduce the salt, as disclosed in, for example, Japanese Patent Publication Nos. 20520/63, 26555/63, 20116/68, 9869/70, 14954/70, 7820/72, 16052/72, 41718/72 and 41719/72 (corresponding to U.S. Pat. No. 3,607,218), Japanese Patent Application (OPI) Nos. 1355/72 (corresponding to U.S. Pat. Nos. 3,756,866), 1363/72, 42252/72, 42253/72, 44194/73, 79754/73 and 82396/73, U.S. Pat. Nos. 3,206,338, 3,494,760, 3,535,104, 3,567,525, 3,661,556, 3,663,318, 3,669,643, 3,672,867 and 3,726,664, and Japanese Patent Application (OPI) Nos. 91498/73, 92720/73, 106901/74 and 134467/74.

Magnetic metal powders produced by the above-described methods should generally not be exposed to air due to their high spontaneous ignition properties. Thus, various methods have been proposed for the stabilization of magnetic metal powders in air. For example, Japanese Patent Publication No. 5608/76 and U.S. Pat. No. 3,748,119 disclose a method for stabilizing magnetic metal powders by improving their compositions. In addition, a method for chemically stabilizing magnetic metal powders by providing thereon a protective layer is known, as disclosed in Japanese Patent Publication Nos. 54998/77, 4803/80, 13761/81 and 28366/81, and Japanese Patent Application (OPI) Nos. 5057/71, 135835/74, 97739/74, 5797/78, 5798/78, 51703/78, 76958/78, 11703/79, 46509/79, 139508/79, 84036/80, 84037/80 and 84038/80.

However, an important problem arises in preparing magnetic coating compositions using the magnetic metal powders produced by the above-described methods. More specifically, heat is generated and accumulated in magnetic metal powder by friction, impact and so on during production. This increases the temperature of the magnetic metal powder and an oxidation reaction occurs which deteriorates the inherent characteristics of the magnetic metal powder.

Although the above-described phenomenon is not significant in handling a small amount of magnetic metal powder, it becomes a serious problem when a large amount of magnetic metal powder is handled in air under dry condition in the production on a commercial scale. For this reason, magnetic metal powder is usually treated while it is dipped in a solvent. Moreover, attempts have been made to avoid strong friction and impact of magnetic metal powder in the production of magnetic coating compositions.

SUMMARY OF THE INVENTION

An object of the invention is to overcome the above-described problem, i.e., process limitations, encountered in preparing magnetic coating compositions using ferromagnetic metal powder.

Another object of the invention is to improve magnetic characteristics; more specifically to improve the Bm and the squareness ratio of magnetic recording medium.

Another object of the invention is to improve the stability with time (weather resistance) of magnetic recording medium.

Another object of the invention is to improve the running resistance of magnetic recording medium.

Another object of the invention is to improve the handling properties (stability with time of coating compositions, filteration properties, etc.) during production of magnetic recording medium.

Another object of the invention is to provide magnetic coating compositions suitable for use in the production of magnetic recording medium having the above-described improvements.

It has now been found that the objects can be attained by kneading a mixture of a magnetic metal powder, an abrasive, a main binder, and a lubricant while applying a shearing stress of from about 20 to about 300 kg/cm$^2$.

The present invention relates to a process for preparing a magnetic coating composition using a dried magnetic metal powder or a magnetic metal powder containing 50% by weight or less of a solvent, which process comprises adding from 0.1 to 10 parts by weight of an abrasive, from 5 to 20 parts by weight of a main binder, and from 0 to 60 parts by weight of a solvent to 100 parts by weight (dry basis) of the magnetic metal powder and, thereafter, kneading the resulting mixture while applying a shearing stress of from about 20 to about 300 kg/cm$^2$.

DETAILED DESCRIPTION OF THE INVENTION

The shearing stress is determined by the clearance between a blade of a kneader and a container, the number of rotations of blades (blade peripheral speed) and so forth. Therefore, by appropriately controlling these conditions, the shearing stress can be adjusted. It is preferred that the kneading process is performed in an atmosphere having an oxygen concentration of 11% or less, more preferably 7% or less. After the kneading process, auxiliary binders, dispersants, lubricants, and so forth are added and kneaded to prepare the desired magnetic coating compositions.

Magnetic metal powders as used in the present invention are metal powders or alloys containing at least one of Fe, Co, and Ni as a main component, and other alloys such as Mn—Bi.

Abrasives as used in the present invention are materials having an average particle size of from about 0.1 to about 1.5$\mu$, preferably 0.2 to 1.2$\mu$, and a Mohs hardness of at least 6, preferably 8 to 10. Preferred examples of abrasives are $\alpha$-alumina, silicon carbide and chromium oxide and the like. These abrasives are described in U.S. Pat. No. 3,630,910.

The water content of the dried ferromagnetic metal powder is of importance and is preferably present in an amount of 1.5% by weight or less. When the ferromagnetic metal powder contains a solvent, it is preferred that the solvent content is controlled to 50% by weight or less. If the water content is more than 1.5% by weight, sufficient effects can not be obtained at the kneading and dispersion steps with a result of poor dispersion. Further, the magnetic characteristics (in particular, squareness ratio) and surface luster of the ultimate magnetic recording member are undesirably deteriorated. Similarly, if the solvent content is more than 50% by weight, the resulting mixture cannot be sufficiently kneaded during the kneading step, and the effects of the present invention can not be obtained.

When magnetic metal powder is subjected to high stress, fresh surfaces are easily exposed which come into contact with air, causing oxidation reaction. Further, abnormal heat is sometimes generated. In extreme cases the powder may catch fire. However, the present inventors have found that when the oxygen concentration of the atmosphere in which the kneading process is performed is controlled to 11% or less and preferably 7% or less, the magnetic metal powder is prevented from catching fire, the generation of heat is very moderate and, furthermore, the weather resistance of the ultimate magnetic recording medium is efficiently improved.

The magnetic metal powder is first ground by applying a shearing stress on the order of 10 kg/cm$^2$, and uniformly mixed with from 0.1 to 10 parts by weight of an abrasive per 100 parts by weight of the magnetic metal powder. When solid additives such as carbon are added, these additives are preferably added at this point. The resulting mixture is then mixed with the main binder in a powder form together with a solvent, or a solution of a main binder, and the mixture is kneaded while applying a shearing stress of from about 20 to about 300 kg/cm$^2$.

It is preferred for the main binder to be added in an amount of from 5 to 20 parts by weight per 100 parts by weight of the magnetic metal powder. Although the main binder can be added in the form of powder or solution with good results, it is preferred that it is added in a form of solution.

The solvent is added within the range of from 0 to 60 parts by weight per 100 parts by weight of the magnetic metal powder.

If the shearing stress is less than about 20 kg/cm$^2$, the mixture is insufficiently kneaded, and a long period of time is needed for the kneading process. On the other hand, if a shearing stress of more than about 300 kg/cm$^2$ is applied, insufficient dispersion results, and deterioration of the magnetic characteristics and surface properties of the resulting magnetic recording medium is observed. The insufficient dispersion is believed to be due to changes in the magnetic metal powder and the resin by the mechanical action.

In general, the shearing stress changes during the kneading process. Although there are many factors for changes in the shearing stress, such changes are caused by changes in properties of the composition, for example, wettability of solid materials by solvent in the composition. In the present invention, however, it is sufficient that the shearing stress is maintained within the range of from about 20 to about 300 kg/cm$^2$ for a period of at least 30 minutes (preferably from 30 to 600 minutes) during the kneading process.

During the kneading process, the temperature of the mixture increases. In order to prevent the heat-decomposition of the binders, it is preferred that the temperature of the mixture is maintained at a temperature of about 80° C. or less. By adsorbing the resin on the individual surfaces of the magnetic metal powder at the kneading step, the dispersion stability is obtained and, at the same time, the adsorption of the dispersant and the lubricant on the powder surface can be prevented. As a result, the amounts of the dispersant and lubricant being added can be reduced, and the running resistance of the magnetic recording member is improved and the staining of recording and reproducing devices can be prevented. Moreover, the magnetic metal powder is dispersed in a monoparticle layer and a uniform distribution, which leads to an increase of output and a reduction of noise.

Auxiliary binders are then added to the mixture, preferably in a solution form, and the mixture is kneaded. Of these auxiliary binders, a polyurethane resin is particularly preferred. The auxiliary binder is preferably used in an amount of 2 to 20 parts by weight together with a solvent in an amount of 10 to 350 parts by weight per 100 parts by weight of the magnetic metal powder (dry basis). Further, dispersants, lubricants and so on are added and the mixture is kneaded.

In the present invention, the order in which the main binder and the polyurethane resin are added can be changed, although this change does not produce sufficient effects.

Using the thus-prepared magnetic coating composition, the desired magnetic recording medium can be produced by the usual techniques. That is, the magnetic coating composition is dispersed in, for example, a sand grinder or a ball mill to prepare a magnetic composition, and the resulting magnetic composition is coated on a non-magnetic support and, if necessary after orientation in a magnetic field, the resulting medium is dried. The resulting medium is then further subjected to a surface treatment, such as calendering, and fabricated into the predetermined size to obtain the desired magnetic recording medium.

Suitable examples of main binders which can be used in the present invention are vinyl chloride copolymers, vinyl chloride/vinyl acetate copolymers, vinyl chloride/vinylidene chloride copolymers, vinyl chloride/acrylonitrile copolymers, acrylic acid ester/vinylidene chloride copolymers, acrylic acid ester/styrene copolymers, methacrylic acid ester copolymers, vinylidene chloride/acrylonitrile copolymers, polyvinyl butyral, cellulose acetate butyrate, cellulose propionate, and nitrocellulose and the like. Of these binders, vinyl chloride copolymers, vinyl chloride/vinyl acetate copolymers, vinyl chloride/vinylidene chloride copolymers, nitrocellulose, polyvinyl butyral, and a phenoxy resin are preferred. These polymers preferably contain functional groups which strengthen adsorption of the binder on magnetic materials. Preferred examples of such functional groups include a hydroxyl group and a carboxyl group. Particularly preferred examples include a vinyl chloride/vinyl alcohol copolymer, a vinyl chloride/maleic acid copolymer, a vinyl chloride/vinyl acetate/vinyl alcohol copolymer, a vinyl chloride/vinyl acetate/maleic acid copolymer, a vinyl chloride/vinyl alcohol/maleic acid copolymer, a vinyl chloride/vinyl acetate/vinyl alcohol/maleic acid copolymer, and nitrocellulose. The degree of polymerization of the vinyl chloride copolymer is preferably from 200 to 600, and the degree of nitration of the nitrocellulose is preferably from 10 to 30%.

Preferred examples of auxiliary binders which can be used in the present invention are rubber-like resins such as a chlorinated rubber, an acrylonitrile/butadiene rubber, polyisobutylene, polychloroprene, polyisoprene, an ethylene/vinyl acetate copolymer and a polyurethane resin. Of these compounds a polyurethane resin is particularly preferred. Of polyurethane resins, polyester polyurethane is particularly preferred which is prepared by urethanizing a polyester derived from diol containing from 1 to 12 carbon atoms and a dicarboxylic acid with a diisocyanate and a chain transfer agent, etc. The molecular weight of the polyurethane resin is preferably from about 10,000 to about 300,000 (calculated based on the weight of styrene).

A variety of conventional lubricants can be used in the invention, including mineral oils, such as spindle oil and turbine oil, low polymerization oils of $\alpha$-olefins such as propylene and isobutylene, aliphatic acid esters such as butyl stearate, sorbitan tristearate and triolein, silicone oil, various aliphatic acid-modified silicones, liquid polyethers, liquid fluorinated polyethers, and fluorinated vinyl chloride low polymerization oils. These lubricants can be used alone or in combination with each other. The amount of the lubricant added is from 0 to 10% by weight, preferably from 0.1 to 5% by weight, based on the weight of the magnetic metal powder.

Examples of dispersants which can be suitably used in the present invention include aliphatic acids such as lauric acid, myristic acid, stearic acid and oleic acid, metallic soaps comprising alkali metal and alkaline earth metal salts of the aliphatic acids, lecithin, higher alcohols, phosphoric acid esters such as oleyl phosphate and polyethylene glycol alkylated phosphate and higher alcohol sulfuric acid esters and the like. These dispersants can be used in an amount of 0 to about 10 wt %, preferably 0.1 to 5 wt %, based on the weight of the magnetic metal powder.

Solvents which can be suitably used in the present invention include liquid organic compounds having a boiling point of from 30 to 250° C., preferably from 50 to 200° C., for example, ketones such as acetone, methyl ethyl ketone, methyl isobutyl ketone, and cyclohexanone, alcohols such as methanol, ethanol, propanol and butanol, esters such as ethyl acetate and butyl acetate, ethers such as diethyl ether, tetrahydrofuran and dioxane, ethylene glycol ethers such as methyl cellosolve and ethyl cellosolve, aromatic hydrocarbons such as toluene and xylene, and straight chain hydrocarbons such as pentane and hexane and halogenated hydrocarbons.

The present invention is further illustrated in greater detail by reference to the following examples and comparative examples, but the present invention is not limited thereto. In these examples, all parts are by weight.

EXAMPLE 1

A mixture of 1,000 parts of dried magnetic metal powder (containing Fe as a main ingredient and a small proportion of Ni, Cr and Zn; average particle diameter: 300Å; mean axis ratio: 8; specific surface area: 34 m$^2$/g; water content: 1.0% by weight) obtained by the iron oxide reduction method, and 50 parts of $\alpha$-alumina (average particle diameter: 0.4$\mu$) was placed in a kneader which had been purged with N$_2$ gas and in which the concentration of oxygen in the atmosphere was 2%, and mixed and ground for 10 minutes. Then, 100 parts of a vinyl chloride/vinyl acetate/vinyl alcohol copolymer, 200 parts of cyclohexanone, 100 parts of toluene, and 200 parts of methyl ethyl ketone were added to the kneader. The resulting mixture was kneaded in the kneader for 2 hours while applying a shearing stress of from 40 to 150 kg/cm$^2$. During this kneading process, the maximum oxygen concentration in the kneader was 4%. Then while kneading the mixture, 80 parts of a polyurethane resin (polyester polyurethane) was gradually added, and furthermore, 35 parts of oleic acid was gradually added, and finally, 1,000 parts of methyl ethyl ketone, 500 parts of toluene, and 1,000 parts of cyclohexanone were added. During this step, the maximum temperature of the mixture was 60° C.

The thus-prepared magnetic coating composition (100 parts) was dispersed in a sand mill for 3 hours. At the end of the time, 10 parts of polyisocyanate (Desmodule L-75, produced by Bayer AG) was added, and the resulting mixture was subjected to a high-speed shearing dispersion treatment for 1 hour to prepare a magnetic coating composition for magnetic tape.

The coating composition was then coated on a 7μ thick polyester film while orientating to a thickness of 4.5μ. The resulting magnetic recording medium was then subjected to a calendering treatment and thereafter, slit into a 3.8 mm width to obtain an audio cassette tape (Sample A).

Observation of the tape surface with FE SEM confirmed that the magnetic metal powder was dispersed uniformly in a mono-particle layer.

EXAMPLES 2 TO 3 AND COMPARATIVE EXAMPLES 1 TO 2

Audio cassette tapes were prepared in the same manner as described in Example 1 except that the types and amounts of the ingredients were changed as shown in Table 1. The tapes produced in Examples 2 and 3, and Comparative Examples 1 and 2 are designated as Samples B, C, D, and E, respectively.

COMPARATIVE EXAMPLE 3

|  | Parts |
| --- | --- |
| Magnetic metal powder (additionally 800 parts of solvent) | 1,000 |
| α-Alumina (particle diameter: 0.5μ) | 50 |
| Vinyl chloride/vinyl acetate/vinyl alcohol copolymer | 100 |
| Polyurethane resin | 80 |
| Oleic acid | 35 |
| Solvent | 3,000 |

These ingredients (the same composition as in Example 1) were uniformly mixed and stirred, and thereafter, dispersed in an sand mill for 5 hours. At the end of the time, 100 parts of polyisocyanate was added, and the resulting mixture was subjected to a high-speed shearing dispersion treatment for 1 hour to prepare a magnetic tape coating composition. Thereafter, an audio cassette tape (Sample F) was produced in the same manner as described in Example 1. The characteristics of each sample are shown in Table 2.

TABLE 2

|  | Sample | | | | | |
| --- | --- | --- | --- | --- | --- | --- |
|  | A Example 1 | B Example 2 | C Example 3 | D Comparative Example 1 | E Comparative Example 2 | F Comparative Example 3 |
| Bm (Gmss) | 3800 | 3800 | 3850 | 3600 | 3850 | 3500 |
| Br (Gmss) | 3220 | 3240 | 3270 | 2970 | 3260 | 2810 |
| Br/Bm | 0.85 | 0.85 | 0.85 | 0.82 | 0.85 | 0.80 |
| HC | 1120 | 1120 | 1120 | 1130 | 1120 | 1140 |
| Surface Luster | | | | | | |
| Before calendering | 100 | 105 | 93 | 50 | 110 | 18 |
| After calendering | 100 | 102 | 92 | 89 | 108 | 85 |
| Bm' (Guss) after being allowed to stand at 60° C. and 90% RH | 3580 | 3600 | 3600 | 3320 | 3580 | 3200 |
| ΔBm (%)** | 5.8 | 5.3 | 6.5 | 7.8 | 7.0 | 8.6 |
| C-90 after 10-repeated passages | | | | | | |
| Stain | | | | | | |
| Head* | 4.6 | 4.5 | 4.7 | 4.0 | 3.0 | 3.5 |
| Pinch Roller* | 4.2 | 4.2 | 4.5 | 3.9 | 3.0 | 3.4 |
| Capstan* | 5.0 | 5.0 | 5.0 | 4.2 | 3.9 | 3.8 |
| Scratch | | | | | | |
| Magnetic Surface* | 4.9 | 4.9 | 4.9 | 4.7 | 3.0 | 4.5 |
| Base Surface* | 4.0 | 4.0 | 4.0 | 4.0 | 4.0 | 4.0 |
| MOL$_{315}$ Hz | 0.0(dB) | +0.2 | 0.1 | −0.6 | +0.3 | −1.5 |
| SOL$_{10K}$ Hz | 0.0 | +0.1 | 0.0 | −0.5 | +0.2 | −0.3 |
| Bias Noise | 0.0 | +0.1 | −0.1 | −0.1 | +0.2 | +0.2 |

*Evaluated according the 5 point evaluation method (an average vlue of n = 100)
**ΔBm = (1-Bm'/BM) × 100 (%)

TABLE 1

|  | Example 2 | Example 3 | Comparative Example 1 | Comparative Example 2 |
| --- | --- | --- | --- | --- |
| 1st Step | | | | |
| Magnetic Metal Powder | 1000 | 1000 | 1000 | 1000 |
| (dipping solvent) | 200 | — | 800 | — |
| α-Alumina | 50 | 30 | 50 | — |
| Vinyl Chloride/Vinyl Acetate/Vinyl Alcohol Copolymer | 100 | 100 | 100 | 100 |
| Solvent | 300 | 400 | 0 | 500 |
| 2nd Step | | | | |
| Polyurethane | 80 | 80 | 80 | 80 |
| Oleic Acid | 35 | 20 | 35 | 35 |
| Solvent | 2500 | 2000 | 2200 | 2500 |
| Polyisocyanate | 10 | 10 | 10 | 10 |

Parts by weight

As can be seen from the results, the present invention produces a high Bm and a high squareness ratio (Br/Bm), and the weather resistance is improved. Furthermore, the running resistance is greatly improved, and the audio characteristics are improved. Thus, there can be obtained well balanced audio tapes.

While the invention has been described in detail and with reference to specific embodiment thereof, it will be apparent to one skilled in the art that various changes and modifications can be made therein without departing from the spirit and scope thereof.

What is claimed is:

1. A process for preparing a magnetic coating composition, comprising the steps of kneading a magnetic metal powder, 0.1 to 10 parts by weight of an abrasive per 100 parts by weight of the metal powder, 5 to 20 parts by weight of a main binder per 100 parts by weight of the metal powder, and 0 to 60 parts by weight of a solvent per 100 parts by weight of the metal powder, while applying a shearing stress of from about 20 to about 30 kg/cm², wherein the process is carried out in an atmosphere containing 11% oxygen or less.

2. A process for preparing a magnetic coating composition as claimed in claim 1, wherein the magnetic metal powder is a dry magnetic metal powder.

3. A process for preparing a magnetic coating composition as claimed in claim 1, wherein the magnetic metal powder is a magnetic metal powder containing 50% by weight or less of a solvent.

4. A process for preparing a magnetic coating composition as claimed in claim 1, further comprising the steps of adding 2 to 20 parts by weight of an auxiliary binder per 100 parts by weight of the metal powder (dry basis) and 10 to 350 parts by weight of a solvent per 100 parts by weight of the metal powder (dry basis) to the resulting kneaded composition to dilute the composition and then kneading the resulting mixture.

5. A process for preparing a magnetic recording coating composition as claimed in claim 1, further comprising adding a dispersant to the diluted and kneaded mixture.

6. A process for preparing a magnetic recording composition as claimed in claim 1, further comprising adding a lublicant to the diluted and kneaded mixture.

7. A process for preparing a magnetic recording composition as claimed in claim 3, wherein the magnetic metal powder is contains 1.5% water or less.

8. A process for preparing a magnetic recording coating composition as claimed in claim 1, wherein the powder, abrasive and binder are all charged into a kneader and the kneading and applying a shearing force are carried out in a kneader.

9. A process for preparing a magnetic recording coating composition as claimed in claim 1, wherein the process is carried out in an atmosphere containing oxygen in an amount of 7% or less.

10. A process for preparing a magnetic recording coating composition as claimed in claim 1, wherein the magnetic metal powder contains as a main component a metal selected from the group consisting of Fe, Co, Ni.

11. A process for preparing a magnetic recording coating composition as claimed in claim 1, wherein the abrasive has a grain size within the range of 0.1 to 1.5μ and a Mohs hardness of 6 or more.

12. A process for preparing a magnetic recording coating composition as claimed in claim 1, wherein the applying a shearing stress is carried out over a period of time of from 30 to 600 minutes.

13. A process for preparing a magnetic recording coating composition as claimed in claim 1, wherein the mixture being kneaded is maintained at a temperature of about 80° C. or less.

* * * * *